United States Patent [19]
Adiego De La Parra

[11] 3,768,899
[45] Oct. 30, 1973

[54] MULTIPLE SLIDE PROJECTOR

[75] Inventor: Luis Antonio Adiego De La Parra, Madrid, Spain

[73] Assignee: Empresa Nacional De Optica, S.A., Madrid, Spain

[22] Filed: May 4, 1970

[21] Appl. No.: 34,252

[30] Foreign Application Priority Data
Jan. 15, 1970 Spain .................................. 375,479

[52] U.S. Cl. ........................ 353/82, 353/34, 353/89
[51] Int. Cl. ...................... G03b 23/00, G03b 21/14
[58] Field of Search .................... 353/25, 26, 27, 30, 353/34, 82, 88, 89, 94, 95; 355/53

[56] References Cited
UNITED STATES PATENTS
3,598,035  8/1971  Haller .............................. 355/53 X
3,566,370  2/1971  Worthington ........................ 353/25
3,338,131  8/1967  Klein ................................... 353/25

Primary Examiner—Louis R. Prince
Assistant Examiner—A. J. Mirabito
Attorney—Wenderoth, Lind and Ponack

[57] ABSTRACT

A projector of multiple slides having a light-tight casing with a projector therein. A light source produces a light beam and a condenser system divides the light beam into a plurality of partial beams corresponding to the number of desired photograms. A slide carrier mounts a slide having a plurality of photograms or images. A shutter with means for activating the shutter manually or automatically interrupts the light beams coming from the photograms in a predetermined sequence. Multiple objectives are arranged to correspond to the photograms of the slides so that one objective corresponds to each photogram.

2 Claims, 2 Drawing Figures

Patented Oct. 30, 1973

3,768,899

Luis Antoni ADIEGO DE LA PARRA,
Inventor

By Wenderoth, Lind
and Ponack   Attorneys

MULTIPLE SLIDE PROJECTOR

This application relates to a multiple slide projector which allows a superposition of images as well as an animated projection with images in movement and the blending thereof at an arbitrary speed.

An object of the invention is to provide an apparatus having a source of light and a condenser formed of reflecting or refracting elements, of non-spheric or spheric shape, of glass material, plastic, etc. The elements which constitute the condenser are arranged in such a manner, that they divide the luminous beam into a number of partial beams, in accordance with the number of images of a slide.

The slider carrier supports a variable number of photograms. These photograms can be independent from each other or they can be put together with each other through a material support. The number of photograms can vary and their arrangement can be regular or irregular.

A shutter is provided which selectively allows or prevents the light coming from the different photograms to reach a viewing screen.

A further object is to provide a shutter which can act independently upon each objective or which can be synchronized through mechanical, electrical, electronic, optical or pneumatic elements.

A further object is to provide an optical system of projection including a variable number of objectives, according to the number of photograms of a multiple slides. A mechanism allows the synchronized displacement of the slides in order to obtain the superposition of the images of the photograms at any projection distance.

With the above and other objects in view which will become apparent from the detailed description below, a preferred form of the invention is shown in the drawings in which.

The light source 1 is preferably a projection lamp of the low voltage halogen type, but it can be of any other type.

Reflector 2 is a spheric mirror.

The condenser is formed of an optical system composed of two systems, one which comprises several lenses 3, 4, 5 and 6 which are centered optically with the reflector. A further lens system 7 produces the division of the light beam into a series of partial beams through as many optical lenses as the partial beams desired, and which are uncentered with relation to the lenses of the first part.

Figure 1:
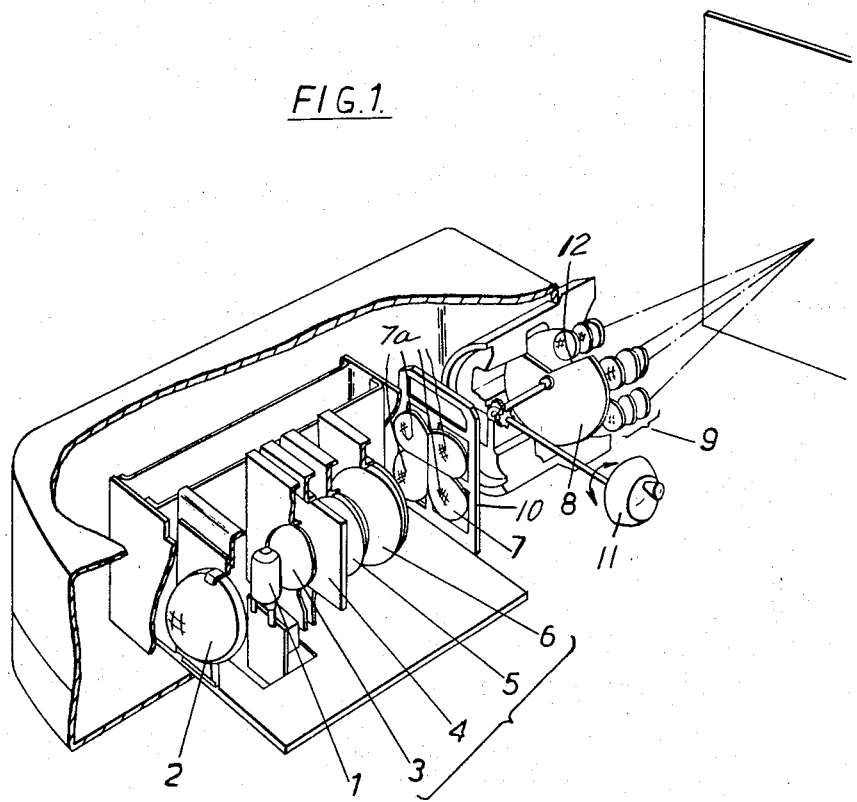
FIG. 1 is a perspective view with parts broken away of the invention.
Figure 2:
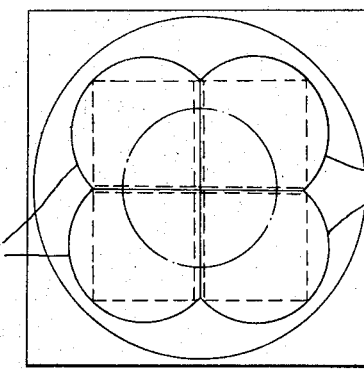
FIG. 2 shows a plan view of an optical system with four elements.

The optical lens system 7 shown in FIG. 2 includes four lens elements 7a, but it is evident that for smaller photograms, while keeping the same useful diameters of the elements of the first condenser section, or for the same size photgram, by increasing the useful diameters of the first condenser section, system 7 can be formed by a greater number of elements.

The four lenses of system 7 are mounted together in order to preserve the relative position of the centers thereof. The optical axis of the reflecting mirror and of the first section of the condenser is the symmetry axis of the optical axes of the elements of the second section.

Each of the elements of second section 7 can be formed of one or several optical pieces, certain parts of which, for space reasons, may be removed since they are not optically functional, and therefore may present an irregular or regular contour (cylindrical, square, etc.).

In the example shown in the drawing, the four elements are optical lenses of an initially circular contour from which have been removed two straight sections to form an angle of 90°.

Slide carrier 10 is positioned between the second condenser system 7 and a rotary shutter 8 and has mounted thereon slides having images. The number of slides corresponds to the number of lens elements 7a. The centers of the slides are aligned with the centers of the lens elements 7a.

The shutter 8 will be described after describing the objective 9.

The objective unit 9 is formed by a number of optical lens systems equal to the number of lenses 7a and the number of slides. Also, the axes of the lenses of unit 9 align with the axes of lenses 7a and the slides.

The lenses of unit 9 are displaceable in a synchronized way, so that the different photograms can be superposed on the same area of a screen, regardless of the distance between the apparatus and the screen.

The shutter is a rotary disc 8 having a sector 12 removed therefrom. The size of the sector 12 relative to the total disc 8 corresponds to the reciprocal of the number of lens elements 7a, slides, and objective lenses provided. For instance, in the illustrated example, sector 12 is one-fourth of the total area of disc 8. Rotation of the shutter disc 8 is provided by crank 11 which suitably is located without the housing of the projector. By selective positioning of sector 12, the light beams from the slide images may be allowed or prevented from reaching their respective objective lens unit. For instance, the sector 12 may be positioned in front of any of the images composing the multiple slide, and this selected image will therefore be projected on the screen, but the light beams corresponding to the other three images will be stopped by the solid part of the shutter disc 8. Since the shutter rotates, each of the four images will successively be projected on the screen.

The rotation speed of the shutter may be regulated at will. When it rotates slowly, the image in projection begins to dissolve smoothly while the next image to be projected gradually appears on the screen, thus producing a mix dissolve similar to that obtained by cinematography, but with certain advantages such that the mix dissolve operation speed may be regulated at operator's will and no central obturator or shutter is employed. On the multiple slide projector of the present invention the mix dissolve of the image is obtained by means of "directional sweeping" (while the shutter rotates the edges of the sector sweep the image being projected) and therefore the previously prepared differential features of two consecutive images may appear gradually on the screen.

If the sector of the shutter is located such that the light beams passing through it can be projected on the screen by means of two consecutive objectives, then a super-position of the two images corresponding to the two objectives in projection will be obtained.

If the shutter is rotated at a high speed, the images of the multiple slide will be quickly and successively projected on the screen. Since these images have been previously prepared, if an animated cartoon technic has been employed, the image projected on the screen will have an animated or movement sensation. This animated sensation may be reduced to the projection of the first and second images or photograms, may include also the third, or may be created inversely. Since the control of the shutter rotation remains completely at operator's will, the order, time, speed, optical effects and the like combinations are limitless.

I claim:

1. A multiple slide projector for producing animated sensations, superpositions and a mix dissolve of projected images, said projector comprising:

a light source for projecting a main light beam;

a condenser comprising first and second optical systems for forming a plurality of partial light beams, said first optical system comprising a plurality of lenses having the central optical axes thereof aligned, said second optical system comprising a plurality, corresponding to said plurality of partial light beams, of lens elements positioned in a plane transverse to the path of said light beams, said central optical axes of said plurality of lenses of said first optical system being parallel with the central axis of the optical axes of said lens elements of said second optical system, a slide carrier containing a plurality, equal to said plurality of lens elements, of slides having images, said carrier positioned such that each of said images aligns with the axis of one of said lens elements of said second optical system;

a multiple objective comprising a plurality, equal to said plurality of lens elements, of objective lenses, the optical axis of each of said objective lenses aligning with the optical axis of one of said lens elements of said second optical system;

a disc-shaped shutter having a sector removed therefrom positioned between said slide carrier and said multiple objective, the central axis of said disc being in alignment with the axis of said first optical system, the size of said sector relative to the total size of said disc-shaped shutter comprising the reciprocal of said plurality of lens elements; and means operatively connected to said shutter for selectively rotating said shutter in a plane transverse to the paths of said projected images to selectively allow said projected images to pass through said sector and to selectively obtain a mix dissolve of said images.

2. A projector as claimed in claim 1, wherein said lens elements of said second optical system each are circular with peripheral sections thereof removed to form straight edges, the straight edges of adjacent lens elements being flush, and the straight edges of each lens element forming an apex at said central axis.

* * * * *